July 3, 1962
D. ROBERTS
3,042,573
PROCESS AND APPARATUS FOR MANUFACTURING
IMPREGNATED FIBROUS MATERIALS
Filed Dec. 15, 1958
2 Sheets-Sheet 1
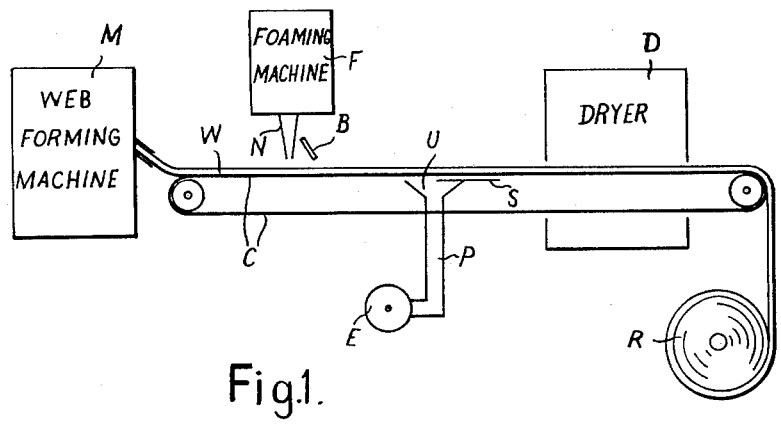
Fig.1.
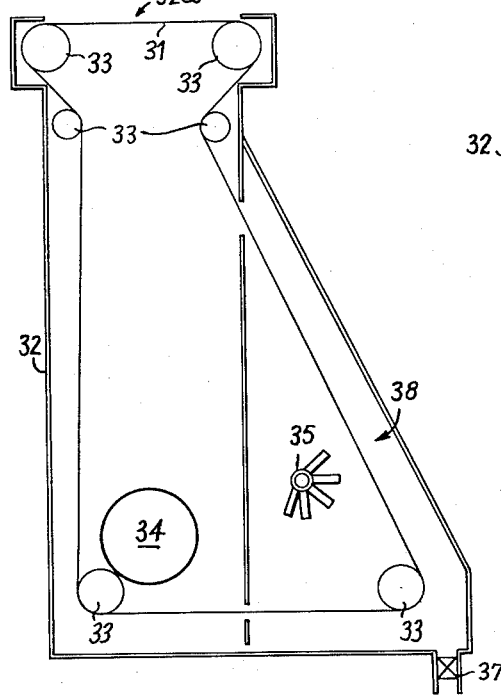
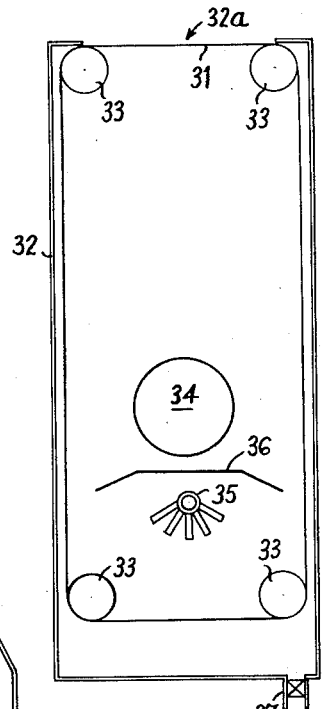
Fig.4.
Inventor
Douglas Roberts
By
Holcomb, Wetherill & Brindisi
Attorneys

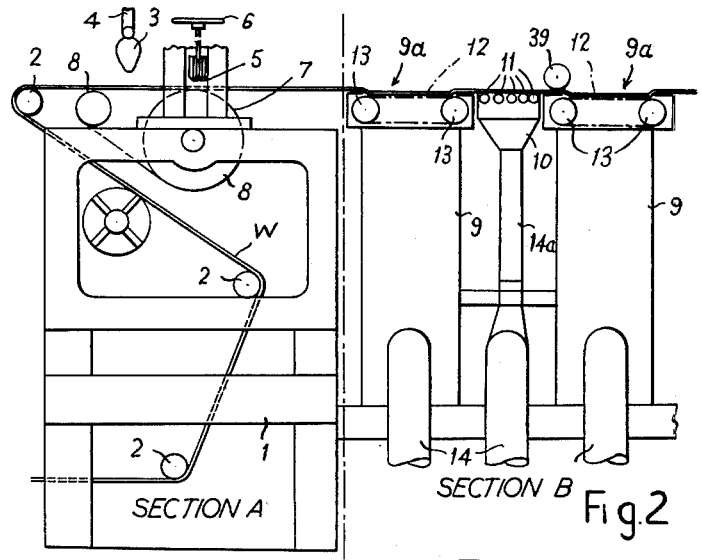
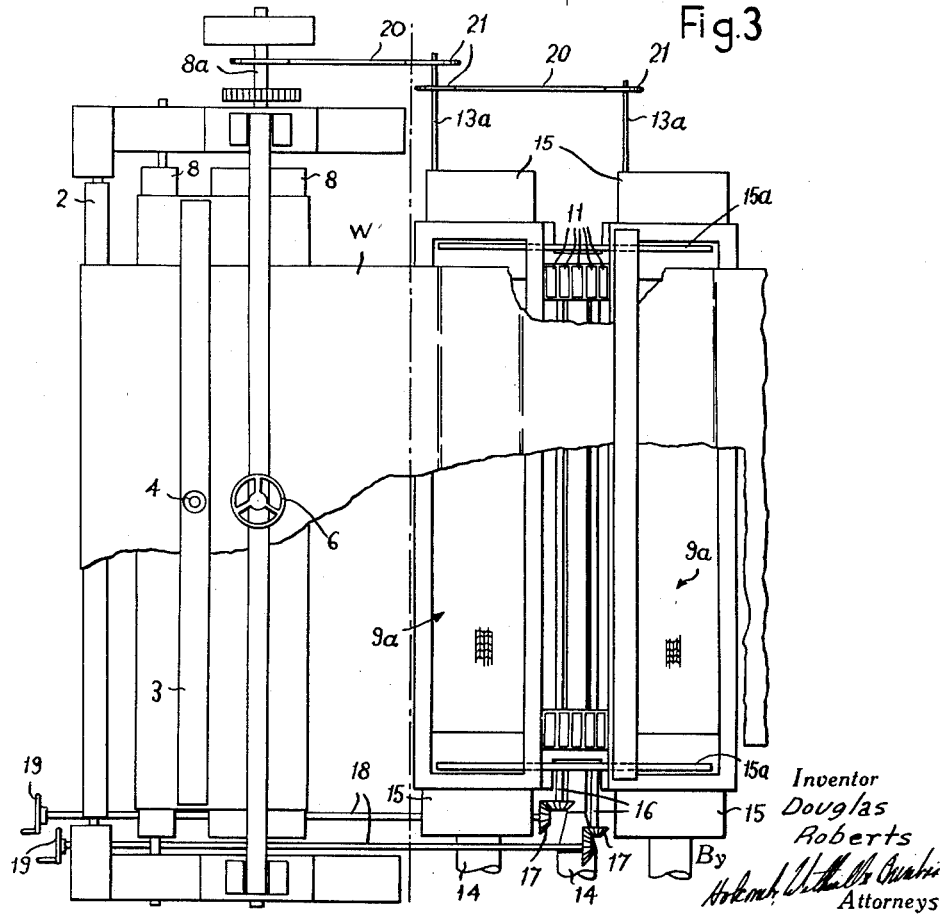

United States Patent Office 3,042,573
Patented July 3, 1962

3,042,573
PROCESS AND APPARATUS FOR MANUFACTURING IMPREGNATED FIBROUS MATERIALS
Douglas Roberts, Worcestershire, England, assignor to Witco Chemical Company Limited, London, England, a British company
Filed Dec. 15, 1958, Ser. No. 780,575
Claims priority, application Great Britain Dec. 24, 1957
12 Claims. (Cl. 156—285)

The present invention relates to a process and apparatus for manufacturing impregnated woven or non-woven fibrous sheet materials.

It is an object of this invention to provide an improved process and apparatus for impregnating sheets or webs of fibrous materials which may have an appreciable thickness, and which enables varying degrees of impregnation to be achieved.

According to the present invention a process for manufacturing impregnated woven or non-woven fibrous sheet material consists in applying an impregnant in the form of a foam on to one surface of a fibrous sheet material and in applying suction to the opposite surface of the fibrous sheet material to suck the impregnant into said fibrous sheet material.

The process according to the present invention is particularly suitable for operation as a so-called continuous process; that is the process is performed by feeding a strip or web of fibrous sheet material past a position in which one surface thereof is coated with the foamed impregnant to a position in which suction is applied to the opposite surface of the fibrous sheet material to suck the impregnant, if necessary.

After impregnation the material may be subsequently submitted to the additional step of curing or drying the impregnant, if necessary.

The invention further consists in apparatus for the manufacture of impregnated woven or non-woven fibrous sheet material comprising means for foaming an impregnant, means for applying the foamed impregnant over one surface of a fibrous sheet material, and means for applying suction to the opposite surface of the fibrous sheet material to suck the impregnant into said fibrous sheet material.

If an impregnating substance is applied to a fibrous material in an unfoamed state, it is very difficult to apply a light weight of impregnant without absorbing an excessive amount of moisture into the material due to the necessity of diluting the impregnant to a large extent in some liquid carrier. This in turn gives rise to drying problems, in that a long time is required to dry out the excess moisture which, in the case where the impregnation is carried out on a continuous moving strip or web of the fibrous material, requires an excessively long drying oven or other drying apparatus. If it is attempted to apply the impregnant in a dryer state by employing less liquid carrier to dilute it the production of the impregnated material becomes much more costly due to the greater weight of impregnant applied and also a light weight of impregnant cannot then be applied. By foaming the impregnant before application to the fibrous material, as in the process according to this invention, it is possible to avoid the above difficulties and obtain a light weight application without excessive moisture. A foamed impregnant is also less likely to decrease the thickness or loft of the fibrous material during the impregnation process than a diluted impregnant with a liquid carrier which is of greater weight and so more easily compresses the web. Particularly in the case of light-weight fibrous materials the application of the impregnant in a foamed state minimises crushing of the fibres.

The process according to this invention enables the depth of penetration or impregnation of the impregnant into the fibrous sheet material to be controlled whereby materials can be produced in which the impregnant only extends partly through the thickness or loft of the material. Such a control can be achieved by varying the degree of suction applied to the fibrous material with the coating applied thereto, by varying the time any given area is subjected to suction and by controlling the amount of suction. This control of depth of penetration of the impregnant into the fibrous sheet material can also be effected by variations in the surface tension of the impregnant applied to the fibrous sheet material.

The surface tension of the impregnant is also a factor which governs the decrease in the thickness or loft of the fibrous material upon application of the impregnant and impregnation therewith. By correct choice of the surface tension of the foamed impregnant, the loft of the fibrous sheet material can usually be substantially maintained even for complete impregnation.

A predetermined amount of impregnant per unit area of the fibrous material is preferably applied to said material whereby a definite controlled density of resultant material can be achieved. Furthermore the amount of impregnant applied per unit area can be calculated in relation to the degree of suction and other varying factors of the process whereby the desired amount of impregnation is achieved and in the case of total impregnation right through the thickness of the material, without any substantial part of the impregnant being drawn off by the gaseous stream through the fibrous material caused by the application of suction. In this way it is readily possible to produce consistently successive batches of impregnated fibrous material of similar density and other properties and the amount of impregnant wasted is very small.

In order further to facilitate drying of the impregnated material and give it a higher state of wet strength a coagulant laden gas may be passed through it having an acidified pH value or positive charge, which assists completely to separate the solid and liquid fractions of the impregnant. The material is subsequently dried in the normal way.

If desired a heat-activated blowing agent may be mixed with the impregnant which is sucked into the fibrous sheet material and the impregnated material is dried by heat which also decomposes the blowing agent to evolve a gas, thereby improving the thickness or loft of the impregnated fibrous sheet material and restoring, at least partially, any loss of loft in the fibrous sheet material caused by the impregnation step.

The fibrous sheet material may also consist of two or more sheets or webs, which may be the same material or of different materials, and which become bonded together upon the introduction of the impregnant through the two or more sheets or webs. In this way a final product of multi-layer or laminated construction is formed. Moreover one or more electrical heating elements preferably in the form of insulated resistance wires may be arranged between two layers of fibrous sheet material prior to the impregnation step, whereby after impregnation the electric heating element or elements are embedded between the layers which are bonded together.

As mentioned previously, one advantage of applying the impregnant in a foamed state is that a light weight of impregnant can be applied without excessive moisture, whereby the application of the impregnant is less likely to decrease the thickness or loft of the fibrous material during the impregnation process than if an impregnant with a liquid carrier, which has a greater weight, is employed. However, it has been found that in the production of very light weight impregnated fibrous materials of substantial thickness, e.g. a thickness of the order of several inches, even a foamed impregnant has sufficient weight to crush the fibres of the material when the latter is of light construction and cause a substantial and undesirable decrease in the thickness of the material after the impregnant has been applied to one surface thereof.

Therefore according to a feature of the process of the invention as applied to producing very light weight materials, prior to spreading the impregnant on the fibrous sheet material, the material is permeated with a vapour, or fine mist or spray of liquid, which is then solidified in the material to impart rigidity thereto, without substantially reducing its porosity, at least during the spreading of the impregnant and subsequent impregnation. The substance with which the fibrous material is permeated may be such that it subsequently combines with the impregnant or it may be removed, e.g. by vapourisation, subsequent to the impregnation step, for example whilst the material is being cured or dried.

In one method of rigidifying the fibrous sheet material prior to impregnation, the material is permeated with water vapour which is then frozen to impart rigidity to the material during the spreading on and impregnation of the impregnant into the material. Where the fibrous material is impregnated with an aqueous dispersion or other aqueous based compound, the water vapour will readily combine with the impregnating compound and any excess moisture can be removed during the drying step. Thus steam may be passed into the fibrous material from nozzles arranged adjacent one surface thereof and the steam-saturated material is then subjected to a cooling operation to freeze the water vapour and rigidify the material prior to spreading the impregnant on one surface of the material.

It will thus be seen that in this way a temporary increase in rigidity can be imparted to the fibrous sheet material enabling it to support the impregnating material without substantially losing loft or thickness. However, this additional rigidity may be removed subsquent to the impregnation step whereby the degree of resilience of the final impregnated material is not impaired.

The impregnants employed in the process according to the present invention may consist of aqueous based compounds of natural or synthetic rubber, such as natural latex compounds and synthetic lattices, for example butadiene-acrylonitrile, butadiene-styrene, butadiene-methacrylate chloroprene polymers. Elastomeric materials with an aqueous or solvent base may also be employed as well as compounds based on synthetic resins, for example vinyl resins such as polyvinyl chloride, polyvinyl acetate and copolymers and polyester resins. Other impregnating compounds may also be used for special applications. For example, waxy hydrocarbons or proprietary wax like proofing agents can also be used in certain cases where it is desired to obtain a waterproof impregnation, or aqueous dispersions of polythene and similar substances may be used, as well as anti-soiling agents. A further impregnant may consist of the constituents for forming a polyurethane foam within the fibrous sheet material.

The fibrous materials employed in the process according to this invention may be either natural or synthetic fibres or a combination of both to produce a web of fibrous material having random, parallel or cross-laid fibres. Felt materials are also suitable as well as sheets or webs of curled hair comprising either natural or synthetic materials. Fibrous materials consisting of or incorporating glass fibres may also be used. Additionally, the process can be applied to certain fibrous boards as well as to woven fibrous materials such as carpeting and fabrics. Fibrous insulation boards may be impregnated with sodium or potassium silicate as bonding agents, or with other impregnants to render them fire retarding.

The non-woven fibrous materials may for example be produced on a conventional batt forming machine, a felt making machine or an air laying machine such as a rando-webber. Such materials may be formed with a proportion of crumb material in their make-up. If the crumb material is resilient, such as rubber crumb, the composite fibrous and crumb material possesses increased resilience.

Prior to impregnation non-woven fibrous materials may be subjected to a needling operation to consolidate the mass of fibres and impart greater resilience of the web. The web may be needled by itself or through a supporting fabric such as hessian, rayon or cotton. Instead of needling other methods which produce similar results may be used.

Preferably the fibrous material employed is web resistant to the impregnant so that the fibres do not tend to become excessively wetted by this substance and collapse thereby destroying the thickness or loft of the fibrous material.

It will be understood that in the process according to the present invention, the impregnation of the fibrous sheet material with the impregnant is achieved by causing a difference in gaseous pressure to exist between opposite surfaces of the web of fibrous material being treated, in order to cause the impregnant to be drawn into the web. Although the application of suction alone to the fibrous material is preferred in order to produce this difference in pressure, it will also be understood that a combination of suction applied to the non-coated side of the fibrous sheet material and an additional gas pressure applied to the coated side of the material may be employed.

The following non-limiting examples illustrate the production of different materials according to the process of the present invention:

*Example 1*

A web of acetate fibres was impregnated with a natural latex compound which had been foamed until its volume was three times its unfoamed volume. The impregnation of the compound into the acetate fibre web was effected by means of suction until the web was impregnated right through, whereafter the material was dried for ten minutes at a temperature of 280° F.

*Example 2*

A web of acetate fibres was coated on one surface with an impregnating compound consisting of a butadiene methacrylate polymer which had been foamed until its volume had increased to six times the volume in the unfoamed state and to which was added a rubber crumb compound. The impregnating compound was then sucked into the web until the web was impregnated right through with the polymer, the rubber crumb compound remaining as a layer on the surface of the web to which the impregnating composition was applied. The resulting material was dried for eight minutes at 280° F. to produce a resilient impregnated web of material having a rubber crumb backing. Other crumb materials such as polyvinyl chloride, cork or mica may be used instead of rubber crumb. Such an impregnant may be employed to deposit a crumb backing on woven or non-woven carpeting.

*Example 3*

A rayon felt web was coated on one surface with a natural latex compound foamed until its volume had increased to three times its unfoamed volume and was then subjected to suction to impregnate the material right through after which it was dried for ten minutes at 350° F.

*Example 4*

A rayon felt material incorporating a woven hessian layer in its thickness was coated on one surface with a reclaimed rubber dispersion which had been foamed until its volume was twice that of the dispersion in the unfoamed state and subjected to suction until the dispersion had impregnated through the felt as far as the hessian layer. This material was dried for ten minutes at 250° F., the resulting product being partially impregnated and having a surface beyond the hessian layer remaining non-impregnated.

Example 5

A rayon felt having a woven hessian backing was coated on its other surface with a natural latex compound foamed until its volume was four times that of the unfoamed compound and subjected to suction to impregnate the felt with the compound and thereafter dried for six minutes at 280° F.

Example 6

An impregnating material as in Example 5 was embossed by passing it through embossing rollers when partially dried in order to produce a pattern on the surface of the felt.

Example 7

An acetate fibre web was coated on one surface with a natural latex compound foamed until its volume was four times that of the unfoamed compound and suction was then applied to the opposite surface of the web until it was impregnated right through with the compound. The material was then dried for six minutes at 280° F. and embossed when partially dried by passing it through embossing rollers to produce a pattern on the surface of the web.

Example 8

A web of waste fibres was impregnated by suction with a reclaimed rubber dispersion, the impregnating compound being applied in a foamed condition whereby its volume was twice that of the unfoamed compound. The impregnating material was dried for five minutes at 280° F. and was passed through squeeze rollers after being partially dried.

Example 9

A fibre glass web was coated on one surface with an unplasticized polyvinyl acetate applied in a foamed state and then its opposite surface was subjected to suction to cause impregnation of the web. The latter was subsequently heated to approximately 300° F. for five minutes to complete the resin reaction and dry the material, a rigid end product being formed. Instead of polyvinyl acetate, a resorcinol formaldehyde resin, or a phenol formaldehyde resin or a urea formaldehyde resin may be used.

Example 10

A web of synthetic fibrous material was impregnated with the constituent substances of polyurethane foam. The impregnating constituents thus consist of polyester or polyether resin, a diisocyanate, a catalyst which may be a tertiary amine, a modifier and an emulsifier. These constituents can be introduced into the web in a number of different ways. Advantageously the polyester or polyether resin and diisocyanate may be mixed together, foamed and spread upon a surface of the web and thereafter drawn into the web by applying suction to the opposite surface of the web. It will be understood that the action of sucking the foamed mixture into the web largely destroys the air cells of the mixture and that the foamed structure of the mixture does not form any significant part of the final cellular structure of the impregnant within the web. The catalyst, modifier and emulsifier are subsequently introduced into the web whereupon the reaction takes place within the web with the evolution of carbon dioxide whereby polyurethane foam is formed disposed within the web of fibrous material. Alternatively all the constituents are mixed together and foamed according to the desired density of the final product and are then spread upon one surface of the web and sucked into the web. In this case, the polyurethane foam reaction is made sufficiently slow in starting to allow the impregnation to be achieved before the formation of the polyurethane foam. After impregnation the constituents react together to produce the polyurethane foam with a resultant increase in the loft of the web of fibrous material. Such a process generally forms a flexible resilient impregnated web, the degree of flexibility depending upon the proportions of the constituent substances, although a rigid end product can also be formed.

Embodiments of apparatus for carrying out the process according to this invention will now be described with reference to the accompanying drawings, in which:

FIGURE 1 illustrates diagrammatically one form of apparatus according to this invention, FIGURE 2 is a side elevation, partly in section, of a further embodiment of apparatus according to the invention.

FIGURE 3 is a plan view of the apparatus in FIGURE 2, certain parts being broken away.

FIGURE 4 is a side elevation of an arrangement for cleaning a perforated conveyor belt associated with an expansion chamber, and FIGURE 5 shows an alternative arrangement for cleaning the conveyor belt associated with an expansion chamber.

Referring to FIGURE 1, there is shown at M a machine, for example an air laying machine such as a "rando-webber," for producing a web W of non-woven fibrous sheet material having random laid fibres. The web of sheet material produced by this machine is carried on the surface of an endless perforated conveyor belt C which may be formed as a mesh or lattice, past a doctor blade B, behind which is applied a foamed impregnating compound with which the fabric is to be impregnated. The foamed compound is applied from a continuous foaming machine F through one or more jets or nozzles N as a coating spread on the upper surface of the web W. Instead of a continuous foaming machine one or more planetary mixers may be used to foam the impregnant. Preferably at least two mixers are employed so that as one mixer is operating to foam a quantity of impregnant, the impregnant already foamed by another mixer is being supplied to the jets or nozzles for coating on the sheet of fibrous material. A plough (not shown) is arranged at each end of the doctor blade B to confine the impregnant to the width of material to be covered. The doctor blade is also adjustable in height in order to control the amount of impregnant applied per unit area to the surface of the material. The fibrous material coated with the impregnant is now fed past an aperture U arranged under the top layer of the perforated conveyor and extending across its width by means of which suction can be applied to the opposite surface of the web to which the impregnant is applied whereby the impregnant is sucked into the web. The suction is produced by means of an electrically driven extractor fan E and applied over a pipe P to the aperture U. The degree of penetration of the impregnant into the web can be adjusted by varying the size of the aperture by means of shutter S to vary the amount of suction applied to a given area of the web. The degree of suction applied to a given area can also be varied by varying the speed of the extractor or by varying the speed of the conveyor. The impregnated web of material is then passed through a drying machine D consisting of a convection air drier, and the dried material wound on a roll R. It will be understood that the type of web forming machine M shown is only given by way of example and that in many cases the fibrous sheet material will be manufactured independently of the impregnation process and will be fed on to the conveyor from a roll of the material, or even as discrete sheets or pieces of material.

Means may also be provided for applying a pattern or wording, for example an embossed or indented pattern or name to the impregnated material produced. This can be done by passing it through embossed or engraved rollers after the impregnant has been at least partially dried, thereby producing any desired pattern. Alternatively if the aperture through which suction is applied to the material is provided with a grill or mesh of a suitable pattern against which the material can rest, or the conveyor belt itself carries such a pattern, the application of suction to the material can cause this pattern to become impressed into the surface of the fibrous material.

Moreover, a template or stencil cut to a desired pattern can be positioned on the upper surface of the fibrous sheet material before the foamed impregnant is applied over the surface, so that the fibrous sheet material is not impregnated in areas where the material of the template or stencil covers its surface and the impregnation can therefore be made to follow the desired pattern. Such an arrangement is useful where impregnation is only required over specific parts of a sheet of fibrous material e.g. for padding for vehicle upholstery and trimming.

With the apparatus described with reference to FIGURE 1 it has been found that a certain amount of suction may be lost due to slight lateral wandering or displacement of the web of fibrous material as it is fed over the aperture in the expansion chamber. This lateral displacement means that a part of the web may not be subjected to any suction towards one edge whilst there is a part of the aperture not covered by the web beyond the opposite edge of the web whereby the suction effect is reduced. This in turn results in uneven impregnation of the material in the areas adjacent the side edges of the web. It is obvious that in order to obtain satisfactory impregnation of the areas adjacent the side edges of the web, these areas must be subjected to effective suction.

In order to overcome the defect, as well as providing at least one main suction device, further suction devices are arranged adjacent to the side edges of the web and positioned to apply suction to the areas adjacent the side edges of the web in order to ensure that efficient suction is applied over these areas. The side suction devices may be adjustable so that they can be correctly positioned for different widths of web treated by the machine and to allow for lateral displacement of the web during its travel.

Instead of employing a single conveyor belt to transport the web of fibrous material through the machine, separate endless conveyor belts may be provided at different parts of the machine, the web travelling from one belt to another on its passage through the machine. Thus the expansion chamber may be provided with an endless perforated conveyor belt which only extends over the aperture of the expansion chamber by which suction is applied to the web and additional suction orifices which are provided adjacent the side edges of the web may advantageously comprise one or more perforated rollers positioned in the orifices and mounted for rotation in the direction of travel of the web, whereby the rollers serve to support the side edges of the web whilst suction can be applied through the perforations thereof.

Furthermore, in order to prevent reduction of suction due to a free space around one side edge of the web, the width of the aperture of each expansion chamber is made slightly less than the width of the web to be impregnated. The side edges areas of the web will then be impregnated by the additional suction devices provided specifically for this purpose. Advantageously adjustable shutters or slides may be provided at the sides of the aperture whereby its width can be altered. The adjustable shutters or slides then also enable the size of the aperture of an expansion chamber to be adjusted for different widths of web treated by the machine.

The side suction devices and the adjustable slides or shutters may advantageously be coupled together and connected to a common control member or members, the actuation of which varies the lateral distance between the side suction devices and also between the slides or shutters whereby the total width over which suction is applied can be adjusted with variation in the width of the web of fibrous material to be impregnated.

Difficulty may also be experienced in maintaining the desired degree of suction applied to the web after the machine has been in operation for some time due to the fact that the mesh or perforations of the conveyor or conveyors travelling over or associated with the expansion chamber or chambers tends to become clogged with the impregnant which has been drawn right through the web, whereby the effect of the suction on the web becomes less. In order to overcome this defect, according to another aspect of the present invention, the perforations or mesh of the conveyor or conveyors are subjected to a cleaning action to remove impregnant therefrom, this action being carried out on any given part of the conveyor whilst that part is not supporting the web for transportation over a suction aperture. The cleaning action can be effected continuously whilst the endless conveyor is rotating or may take place intermittently either automatically or under manual supervision. Advantageously cleaning is effected by means of a fluid jet or spray directed on to or through the perforations or mesh of the conveyor. A high pressure water jet has been found effective in cleaning the conveyor but other cleaning fluid may be used, according to the nature of the impregnant such as another liquid or a high pressure air blast.

In one arrangement, each expansion chamber of the machine is provided with an endless conveyor which is supported on rollers for rotation within the expansion chamber, the portion of the conveyor adjacent the outlet aperture at any one time serving for transporting the web of material to be impregnated. A series of nozzles are arranged adjacent the lower part of the expansion chamber to direct a high pressure water spray on to the part of the conveyor travelling past the nozzles. The nozzles may be arranged actually in the part of the expansion chamber to which the suction is applied or alternatively may be arranged in a separate compartment of the expansion chamber from that to which the suction is applied, the conveyor being guided through this separate compartment during its travel.

Advantageously the conveyor may be made of wire mesh treated with a coating of a synthetic resin material which facilitates the cleaning of the conveyor by the cleaning fluid. For example the conveyor may be made from a stainless steel wire coated with polytetrafluoroethylene.

Where the machine includes several conveyor belts over which the web travels in succession it is generally desirable to drive these conveyors in synchronism with each other in order to prevent pulling of the web, or even tearing in the case of a loosely formed non-woven fibrous material. To this end a driving linkage may be connected between the various conveyors which may take the form of belt or chain drives associated with pulleys or sprockets attached to the shafts driving the conveyors. Such an arrangement prevents any slip between the conveyor belts and the web of fibrous material and therefore also ensures that any pattern or other information impressed on the web by the conveyor as previously described will become clearly marked in the web.

Referring now to FIGURES 2 and 3, there is shown an embodiment of a machine incorporating the features mentioned above. The machine consists of a section A, wherein the upper surface of a web of fibrous material is coated with an impregnant and a section B wherein the coated web is subjected to suction to draw the impregnant into the web.

Section A of the machine consists of a frame 1 supporting guide rollers 2 for guiding the web W of fibrous material to be impregnated from a roll (not shown) to a position where the impregnant in a foamed condition is fed from the outlet nozzle 3 on to the upper surface of the web across the width of the web. The nozzle 3 may have a single outlet extending across the width of the web or a series of spaced outlets and is supplied with foamed impregnant through a pipe 4 from a storage tank feeding a continuous foaming machine (not shown). The nozzle 3 spreads a coating of foamed impregnant on the upper surface of the web and a doctor blade 5 which can be adjusted by means of a wheel 6 is arranged in front of the nozzle 3 in order to control the thickness of the coating of impregnant applied to the surface of the web. The web is conveyed under the nozzle 3 and doctor blade 5 by means of an endless conveyor belt 7 rotating over rollers 8.

The web W coated with impregnant on its upper surface then passes from the conveyor belt 7 in section B of the machine, wherein the suction impregnation of the compound into the web is carried out. The suction apparatus consists of two separate expansion chambers 9 spaced apart in the direction of the travel of the web and between which are arranged two separate side suction devices 10 each having an orifice associated with a series of perforated rollers 11, the devices 19 being positioned respectively adjacent the opposite side edges of the web. An endless perforated conveyor belt 12 which may be formed as a mesh or lattice traveling over rollers 13 is located within an aperture 9a at the top of each of the expansion chambers, for transporting the web of fibrous material over that chamber. The rollers 11 support the side edges of the web during its passage over the side suction devices 10. The two expansion chambers 9 and also the side suction devices 10 have suction applied through pipes 14, the suction being generated by means of one or more extractor fans (not shown). The speed of the fan or fans may be variable to control the degree of suction produced or this may be effected by means of adjustable valves in the pipes 14. The roller 39 positioned above the web as it passes to the second expansion chamber is arranged to rest lightly on the top of the web to smooth out any areas of foamed impregnant remaining on top of the web, due for example to denser portions of the web which hinder the suction of the first expansion chamber from drawing the foam into the web over those areas.

As previously explained, the suction applied through the expansion chamber 9 and perforated conveyors 12 serves to effect impregnation of the web over the greater part of its width, whilst the side suction devices 10 apply suction to the areas adjacent the side edges of the web in order to ensure that sufficient suction is applied over these areas to achieve impregnation and to allow for any lateral displacement or wandering of the web.

The apertures 9a of the expansion chambers are provided with adjustable slides 15 (FIGURE 3) at their side edges which enables the width of the aperture 9a through which suction is applied to the web to be adjusted in accordance with the width of the web of fibrous material which is being treated, and also serves to prevent wastage of suction around the side edges of the web due to any lateral wandering of the web during its passage over the suction devices.

In order that the side suction devices 10 are always in the correct position adjacent the side edges of the web regardless of the width of web being treated, the side suction devices can also be displaced towards and away from each other. To this end the section of pipe 14a feeding these devices consists of a flexible pipe. The displacement of each side suction device is achieved by means of a screw driving shaft 16 engaging in threaded bushes on the side suction device and connected through bevel gears 17 to a further shaft 18 provided with a manual control handle 19. A separate control mechanism is provided for each of the side suction devices 10 whereby rotation of the appropriate handle 19 causes movement of one side suction device relative to the other. This control mechanism is also arranged to effect simultaneous movement of the slides 15 associated with the apertures of the suction chambers, so that these slides are moved towards and away from each other with corresponding movement of the side suction devices. To this end the slides are coupled to the side suction devices by means of bars 15a.

As mentioned previously, one or more of the perforated conveyors 12 transporting the web of fibrous material over the suction devices may be formed with or carry a distinctive pattern or lettering which will become embossed or impressed into the surface of the impregnated web due to the action of the suction. Particularly with such an arrangement it is necessary to avoid slip between the conveyor belt and the web of fibrous material as otherwise the pattern or other information will not become clearly embossed or impressed into the web. To this end the various conveyor belts are driven in synchronism so that they all travel at the same linear speed. This is achieved by driving the conveyor 7 through shaft 8a associated with one of the rollers 8 and which is connected with shafts 13a driving conveyors 12 through rollers 13, by means of belt or chain drives 20 running over pulleys or sprockets 21 mounted on the ends of the shafts. The drive to the shaft 8a, for rotating the conveyors may be provided by means of an electric motor or other prime mover, not shown. The speed of this motor may be made variable to control the rate of travel of the web through the machine.

After the web W of fibrous material has been impregnated in section B of the machine it is passed through a drying device (not shown) and may be wound in a roll.

FIGURE 4 shows an arrangement according to the invention for cleaning the mesh or perforations of a conveyor belt associated with an expansion chamber, in order to prevent the conveyor mesh becoming clogged with impregnating compound and hence the consequent reduction in the effect of the suction on the web. In the arrangement shown an endless mesh conveyor belt 31 is arranged to extend for almost the full depth of the expansion chamber 32 and is guided in its movement by means of rollers 33, one of which constitutes a driving roller. The conveyor which is made of stainless steel mesh treated with polytetrafluoroethylene travels past the aperture 32a in the top of the chamber 32 and suction is applied to a web of fibrous material as it is carried over this aperture by the conveyor. The suction is applied to the expansion chamber through the pipe outlet 34 which is arranged part of the way up the wall of the chamber. Beneath this outlet 34 is arranged a series of nozzles 35 through which water jets can be directed on to the part of the conveyor travelling past the jets at any instant, whereby any compound adhering to the conveyor is washed off and the mesh remains open. A screen 36 is provided separating the nozzles from the outlet 34, in order to minimise the effect of suction on the water jets. A drain cock 37 is provided at the bottom of the chamber 32 through which the water can be drained away.

FIGURE 5 shows an alternative arrangement for cleaning the conveyor 31 wherein the nozzles 35 are situated in a separate compartment 38 located at the side of the expansion chamber 32, the conveyor 31 travelling through this compartment during its rotation. In this embodiment, the suction outlet 34 is located adjacent the bottom of the main expansion chamber 32 and the drain cock 37 is provided at the bottom of the side compartment 38.

It will be understood that expansion chambers constructed in accordance with FIGURE 4 or 5 may be incorporated in the machine described with reference to FIGURES 2 and 3, in place of the expansion chambers shown in those latter figures.

Whilst particular embodiments have been described it will be understood that various modifications may be made without departing from the scope of this invention. Thus the arrangement described comprising two expansion chambers with two side suction devices is only given as an illustrative example, and any other desirable combination of expansion chambers and side suction devices may be provided depending upon the size of the machine and the type of material to be treated. Moreover, the nozzle 3 for feeding the foamed impregnating compound on to the web may be designed to apply a layer of compound of the desired thickness for any particular application in which case the doctor blade 5 can be dispensed with. Variation in layer thickness can be achieved by making the outlet orifice of nozzle 3 adjustable, or by having interchangeable nozzles.

A material produced according to the present invention may be made rigid, soft, or resilient with good elasticity and good recovery properties and may have appreciable thickness. Furthermore, since it is possible to deposit substantially the exact amount of impregnant required to achieve the desired depth of penetration of the fibrous material, excessive soaking of the material by the impregnant is avoided, as occurs when impregnation is effected by dipping in a bath of the compound. The process according to the present invention also enables impregnation of a fibrous material generally to be achieved without losing substantial loft or thickness in the material.

Material produced according to the present invention may be employed, for example, as carpet underlay or for upholstery. Furthermore, particularly if it is stiffened by the use of appropriate fibrous and coating compounds it may be employed as a building insulation material.

The process of the present invention may also be employed for impregnating carpets and textile fabrics as well as for numerous other purposes.

I claim:

1. A process for manufacturing impregnated fibrous sheet material which consists in applying an impregnant in the form of a foam as a coating on to one surface of a web of fibrous sheet material, and then feeding the coated web past a position at which suction is applied to the opposite surface of the web to suck the impregnant into said fibrous sheet material.

2. A process as claimed in claim 1, in which the foamed impregnant includes particles of a solid material which, when suction is applied to the fibrous sheet material are drawn into contact with the surface of the fibrous sheet material to which the impregnant is applied, and remain as a layer on that surface.

3. A process as claimed in claim 1, in which the fibrous sheet material consists of at least two layers which become bonded together upon the introduction of the impregnant through said at least two layers.

4. A process as claimed in claim 3, in which at least one electric heating element is arranged between two layers of fibrous sheet material prior to the impregnation step, whereby after impregnation the electric heating element is embedded between the layers which are bonded together.

5. Apparatus for the manufacture of impregnated fibrous sheet material comprising means for foaming an impregnant, means for applying the foamed impregnant over one surface of a fibrous sheet material and means for applying suction to the opposite surface of the fibrous sheet material to suck the impregnant into said fibrous sheet material.

6. Apparatus as claimed in claim 5, including means for drying the impregnated fibrous sheet material subsequent to the application of suction thereto.

7. Apparatus as claimed in claim 5, in which the foamed impregnant is delivered from at least one nozzle on to the upper surface of the fibrous sheet material to be impregnated and means are provided for adjusting the thickness of the coating of foamed impregnant on the material.

8. Apparatus for the manufacture of impregnated fibrous sheet material, comprising means for foaming an impregnant, means for feeding a web of fibrous sheet material to be impregnated past a position at which the foamed impregnant is applied as a coating over the upper surface of the web, and means for feeding the coated web to a further position at which suction is applied to the lower surface of the web to draw the foamed impregnant into the web.

9. Apparatus as claimed in claim 8, including an extractor fan associated with an expansion chamber for producing the suction, an aperture in the upper surface of the expansion chamber over which is carried the web of fibrous sheet material to be impregnated, and means for varying the size of the aperture.

10. Apparatus as claimed in claim 8, wherein as well as providing at least one main suction device, further suction devices are arranged adjacent to the side edges of the web and positioned to apply suction to the areas adjacent the side edges of the web in order to ensure that sufficient suction is applied over these areas.

11. Apparatus as claimed in claim 10, including means for adjusting the position of the side suction devices towards and away from each other.

12. Apparatus as claimed in claim 8, including a perforated conveyor for transporting the web of fibrous material past the suction device and means for cleaning the conveyor in order to remove impregnant from the perforations of the conveyor.

References Cited in the file of this patent

UNITED STATES PATENTS

| | | |
|---|---|---|
| 1,047,822 | Marche | Dec. 17, 1912 |
| 2,341,130 | Unsworth | Feb. 8, 1944 |
| 2,697,056 | Schwartz | Dec. 14, 1954 |
| 2,711,381 | Novotny et al. | June 21, 1955 |
| 2,719,795 | Nottebohm | Oct. 4, 1955 |
| 2,719,806 | Nottebohm | Oct. 4, 1955 |
| 2,879,197 | Muscat et al. | Mar. 24, 1959 |
| 2,890,146 | Unsworth | June 9, 1959 |